United States Patent
Karahashi (10) Patent No.: US 11,368,610 B2
(45) Date of Patent: Jun. 21, 2022

(54) IMAGE CAPTURE APPARATUS AND CONTROL METHOD THEREFOR

(71) Applicant: CANON KABUSHIKI KAISHA, Tokyo (JP)

(72) Inventor: Fumihito Karahashi, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/373,149

(22) Filed: Jul. 12, 2021

(65) Prior Publication Data
US 2022/0021796 A1    Jan. 20, 2022

(30) Foreign Application Priority Data
Jul. 16, 2020    (JP) .............................. JP2020-122346

(51) Int. Cl.
| H04N 9/73 | (2006.01) |
| H04N 5/232 | (2006.01) |
| H04N 5/378 | (2011.01) |
| H04N 5/3745 | (2011.01) |
| H04N 5/235 | (2006.01) |

(52) U.S. Cl.
CPC ........... *H04N 5/232* (2013.01); *H04N 5/2357* (2013.01); *H04N 5/378* (2013.01); *H04N 5/37452* (2013.01)

(58) Field of Classification Search
CPC .. H04N 5/232; H04N 5/2357; H04N 5/37452; H04N 5/378; H04N 5/341; H04N 5/353; H04N 5/235
See application file for complete search history.

(56) References Cited

U.S. PATENT DOCUMENTS

| 2012/0206640 | A1* | 8/2012 | Nakagawara | .......... G03B 13/36 |
| | | | | 348/E5.034 |
| 2014/0375838 | A1* | 12/2014 | Shimoozono | ........ H04N 5/2357 |
| | | | | 348/226.1 |
| 2017/0343882 | A1* | 11/2017 | Furuta | .................... G03B 7/093 |
| 2021/0329161 | A1* | 10/2021 | Fujikawa | ............. H04N 5/2357 |

FOREIGN PATENT DOCUMENTS

JP    2019-126014 A    7/2019

* cited by examiner

*Primary Examiner* — Kelly L Jerabek
(74) *Attorney, Agent, or Firm* — Cowan, Liebowitz & Latman, P.C.

(57) ABSTRACT

Each of pixels of an image sensor has a first read-out path for reading an electric charge that is once stored in a first storage circuit, and a second read-out path for reading an electric charge without going through the first storage circuit. An image capture apparatus controls operation of the image sensor so that: an electric charge obtained by the photoelectric conversion device related to capturing based on an instruction by a user is read via the first read-out path; an electric charge obtained by the photoelectric conversion device related to capturing for information detection is read via the second read-out path. The reading via the second read-out path is executed in a period overlapping a period for reading an electric charge via the first read-out path.

13 Claims, 9 Drawing Sheets

IMAGE CAPTURE APPARATUS AND CONTROL METHOD THEREFOR

BACKGROUND OF THE INVENTION

Field of the Invention

The present invention relates to an image capture apparatus and a control method therefor.

Description of the Related Art

Fluorescent lights and some LED illuminations and the like are light sources that blink at a high speed (flickering light sources). A flicker correction that adjusts a shutter speed or a start timing for capturing in order to reduce the influence on a captured image of the blinking (flickering) of a flickering light source is known (Japanese Patent Laid-Open No. 2019-126014).

In order to perform flicker correction, it is necessary to detect characteristics of the flickering light source (the cycle, peak timing, or the like of the flicker). The characteristics of the flickering light source can be detected (flicker detection) based on a change in luminance across images captured temporally. However, when a continuous shooting speed becomes high, it becomes difficult to perform flicker detection during continuous shooting of still images because the time for capturing the images for the flicker detection that is performed between still image captures is reduced. As a result, there are cases where the accuracy of the flicker correction on continuously shot still images is low.

SUMMARY OF THE INVENTION

An aspect of the present invention provides an image capture apparatus and a control method that can perform flicker detection even during high-speed continuous shooting.

According to an aspect of the present invention, there is provided an image capture apparatus, comprises: an image sensor; and a controller that controls operation of the image sensor, wherein the image sensor has a plurality of pixels, each of the plurality of pixels comprises a photoelectric conversion device; and a first storage circuit that stores an electric charge obtained by the photoelectric conversion device, and has a first read-out path for reading an electric charge stored in the first storage circuit, and a second read-out path for reading an electric charge obtained by the photoelectric conversion device without going through the first storage circuit, and wherein the controller controls operation of the image sensor so that: an electric charge obtained by the photoelectric conversion device related to capturing based on an instruction by a user is read via the first read-out path; an electric charge obtained by the photoelectric conversion device related to capturing for information detection is read via the second read-out path; and reading via the second read-out path of the electric charge obtained by the photoelectric conversion device related to capturing for information detection is executed in a period overlapping a period for reading an electric charge via the first read-out path.

According to another aspect of the present invention, there is provided a control method of an image capture apparatus that comprises an image sensor; and a controller that controls operation of the image sensor, the image sensor having a plurality of pixels, each of the plurality of pixels comprising a photoelectric conversion device and a first storage circuit that stores an electric charge obtained by the photoelectric conversion device, and having a first read-out path for reading an electric charge stored in the first storage circuit and a second read-out path for reading an electric charge obtained by the photoelectric conversion device without going through the first storage circuit, wherein the method comprises: reading, via the first read-out path, an electric charge obtained by the photoelectric conversion device related to capturing based on an instruction by a user; and reading, via the second read-out path, an electric charge obtained by the photoelectric conversion device related to capturing for information detection, and wherein the reading via the second read-out path is executed in a period overlapping a period for reading an electric charge via the first read-out path.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. In the attached drawings, the same reference numerals denote the same or similar parts and a repetitive description thereof will be omitted.

Note that the following embodiments will be described in relation to a case where the present invention is implemented on a digital camera. However, the present invention is applicable to arbitrary electronic devices that have an image capture function. Examples of such an electronic device include a video camera, a computer device (e.g., a personal computer, a tablet computer, a media player, and a PDA), a mobile telephone device, a smartphone, a game device, a robot, a drone, and a driving recorder. These are merely examples, and the present invention can be implemented in other electronic devices.

First Embodiment

Figure 1:
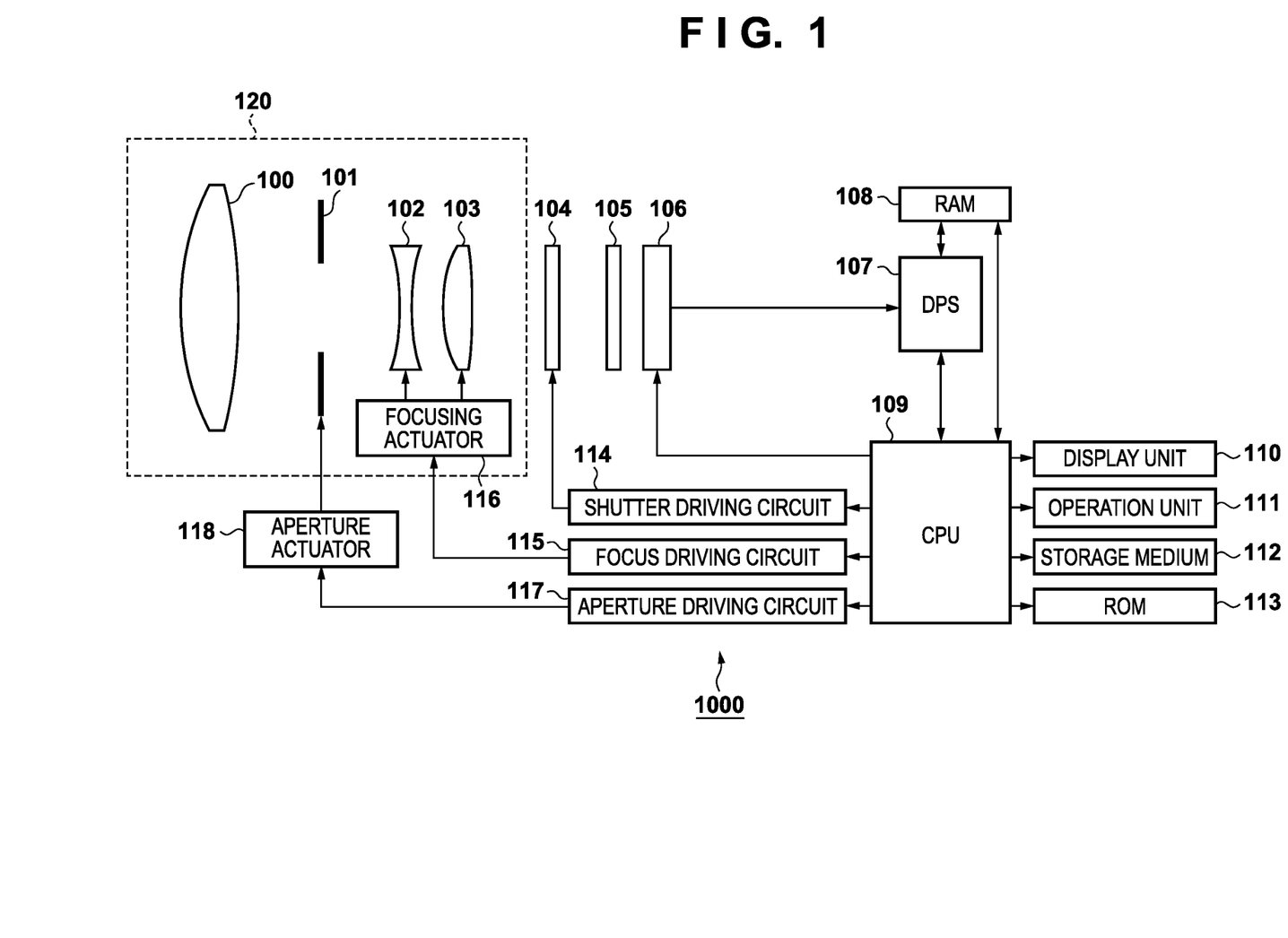
FIG. 1 is a block diagram that illustrates an example of a functional configuration of a digital camera 1000 which is an example of an image capture apparatus according to an embodiment.

FIG. 1 is a block diagram that illustrates an example of a functional configuration of a digital camera 1000 in the first embodiment. An imaging optical system 120 of the digital camera 1000 may not be detachable. The imaging optical system 120 has a plurality of lenses including a first lens 100, a second lens 102, and a third lens 103. The second lens 102 and the third lens 103 function as a focus lens for adjusting an in-focus distance of the imaging optical system 120.

The positions in the optical-axis direction of the second lens 102 and the third lens 103 are controlled by a CPU 109 through a focus driving circuit 115 and a focus actuator 116. An opening amount of an aperture 101 is controlled by the CPU 109 through an aperture driving circuit 117 and an aperture actuator 118. Note that the aperture actuator 118 may be included in the imaging optical system 120.

A focal plane shutter 104 is a mechanical shutter and adjusts a time of exposure during still image capturing. Operation of the focal plane shutter 104 is controlled by the CPU 109 through a shutter driving circuit 114. Note that the focal plane shutter 104 is not necessary, and the time of exposure may be adjusted by using an electronic shutter function that is realized by controlling operation of an image sensor 106. An optical low-pass filter 105 can be used to reduce a pseudo color or moiré that is generated in a captured image.

The image sensor 106 is, for example, a CMOS image sensor. The image sensor 106 has a plurality of pixels disposed two-dimensionally. The image sensor 106 converts an optical image that the imaging optical system 120 forms into an electrical signal group (an analog image signal) by a plurality of pixels. In the present embodiment, the image sensor 106 has an A/D conversion function, and outputs a digital image signal (image data) that the analog image signal is A/D-converted into. Note that the A/D conversion of the analog image signal may be performed by a DSP 107. Operation of the image sensor 106 is controlled by the CPU 109.

A DSP (Digital Signal Processor) 107 is an image processing circuit. The DSP 107 applies predetermined image processing to the image data read out from the image sensor 106, and generates and/or acquires various signals, data, and information.

Here, the image processing that the DSP 107 applies includes, for example, preprocessing, color interpolation processing, correction processing, detection processing, data editing processing, evaluation value calculation processing, special effects processing, or the like. The preprocessing includes signal amplification, defective pixel correction, or the like. Color interpolation processing is processing for interpolating a value of a color component that cannot be achieved during capturing, and is also referred to as demosaicing processing and synchronization processing.

The correction processing includes white balance adjustment, tone correction (gamma processing), processing for correcting an influence of optical aberration or vignetting of the imaging optical system 120, processing for correcting a color, or the like. The detection processing includes detection of a characteristic area (for example, a face area and a human body area) and a motion thereof, person recognition processing, later-described flicker detection, or the like.

The data editing processing includes composition processing, scaling processing, encoding and decoding processing, header information generation processing, and so forth. The evaluation value calculation processing includes generating signals, evaluation values, and the like used in automatic focus detection (AF), processing for calculating evaluation values used in automatic exposure control (AE), and the like.

The special effects processing includes addition of blur, changing of tones, relighting processing, and so on. Note these are examples of image processing that the DSP 107 can apply, and the image processing that the DSP 107 applies is not limited to this.

The RAM 108 is used as a buffer memory for image data read out from the image sensor 106, a work memory for the DSP 107 or the CPU 109, or the like. Also, the RAM 108 may be used as a video memory for a display unit 110. Note that other storage apparatuses may be used instead of the RAM 108. Also, at least a part of the RAM 108 may be included in the DSP 107 and the CPU 109.

The CPU 109 is a hardware processor and functions as a main controller of the digital camera 1000. The CPU 109 realizes functions of the digital camera 1000 by loading a program stored in a ROM 113 into the RAM 108 and executing it. The CPU 109, as a part of its operation, executes AE processing for deciding exposure conditions based on an evaluation value obtained from the DSP 107 and AF processing for adjusting an in-focus distance of the imaging optical system 120.

Also, the CPU 109, based on luminance information obtained from the DSP 107, for example, detects whether or not there is a flickering light source and a characteristic of the flickering light source. The characteristic of the flickering light source is for example the flicker cycle and the timing. The CPU 109, by controlling operation of the image sensor 106 based on the detected characteristics of the flickering light source, reduces the influence of the flickering light source on the images obtained in capturing. The image sensor 106 may have the function of detecting whether or not there is a flickering light source and the characteristics of the flickering light source.

The display unit 110 is, for example, a liquid crystal display, and displays image data obtained by capturing, various information of the digital camera 1000, and the menu screen, or the like.

An operation unit 111 is a collective term for input devices (buttons, switches, dials, or the like) arranged for the user to input various instructions into the digital camera 1000. The input devices constituting the operation unit 111 are named according to the functions assigned thereto. For example, the operation unit 111 includes a release switch, a moving image recording switch, a capturing mode selection dial for selecting the capturing mode, a menu button, directional keys, an enter key, or the like.

The release switch is a switch for recording a still image, and the CPU 109 recognizes a halfway-pressed state of the release switch as a capturing preparation instruction and a fully-pressed state as a capturing start instruction. Also, the CPU 109 recognizes an instruction to start recording of a moving image when the moving image recording switch is pressed by the capturing standby state, and recognizes a recording stop instruction when pressed during recording of a moving image.

Note that the functions allocated to the same input device may be variable. Furthermore, the input devices may be software buttons or keys that use a touch display. Also, the operation unit 111 may include input devices corresponding to non-contact input methods such as a voice input, a sight line input, or the like.

A storage medium 112 is a recording destination for the image data obtained by capturing. The storage medium 112 may be a detachable semiconductor memory card, for example.

The ROM 113 stores a program that has commands that the CPU 109 can execute, setting values for the digital camera 1000, GUI data, and the like. The ROM 113 may be rewritable.

The shutter driving circuit 114 drives the focal plane shutter 104 under the control of the CPU 109. The focus driving circuit 115 controls the focus actuator 116 in accordance with control by the CPU 109, and the second lens 102 and the third lens 103 adjusts the position of the optical-axis direction. The aperture driving circuit 117 controls the aperture actuator 118 in accordance with control by the CPU 109, and adjusts the opening amount of the aperture 101.

Figure 2:
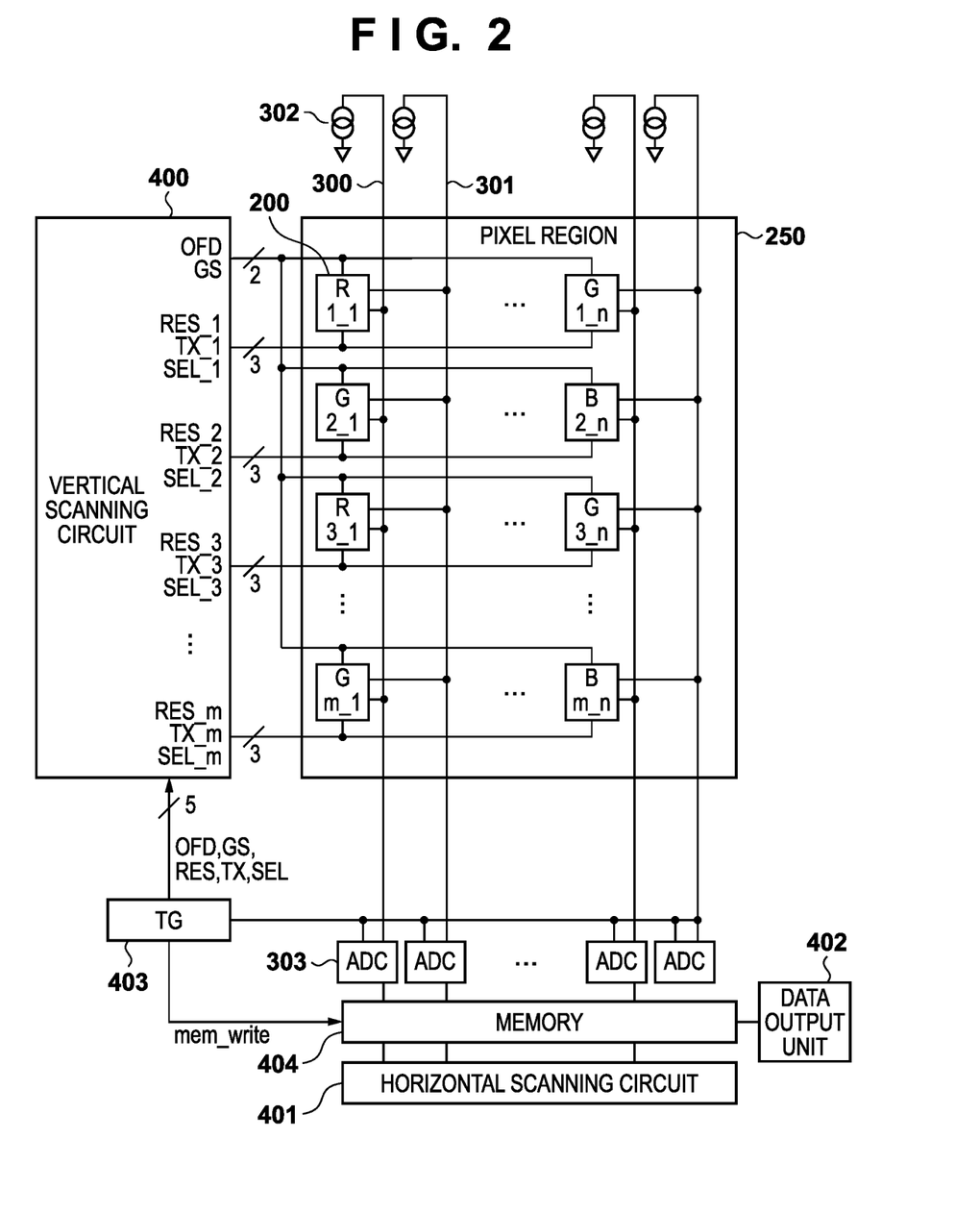
FIG. 2 is the circuit diagram that illustrates an example of a configuration of an image sensor that the image capture apparatus according to an embodiment uses.

FIG. 2 is a view illustrating an example of a circuit configuration of the image sensor 106. In a pixel region 250 (referred to as the pixel array), a plurality of pixels 200 are arranged in a matrix pattern. In FIG. 2, the pixels 200 are disposed in m rows and n columns (m and n are integers 2 or higher). Also, a color filter of one color of red (R), blue (B), and green (G) is arranged in the pixel 200 in accordance with a primary-color Bayer arrangement. In FIG. 2, the R, G, or B recited for respective pixels 200 indicates a color of the color filter that is arranged. Also, i_j (1□i□m, 1□j□n) indicates pixel coordinates (the i-th row and the j-th column). For example, the red color filter arranged for the pixel 200 described as R3_1 and is positioned at the third row and the first column.

Figure 3:
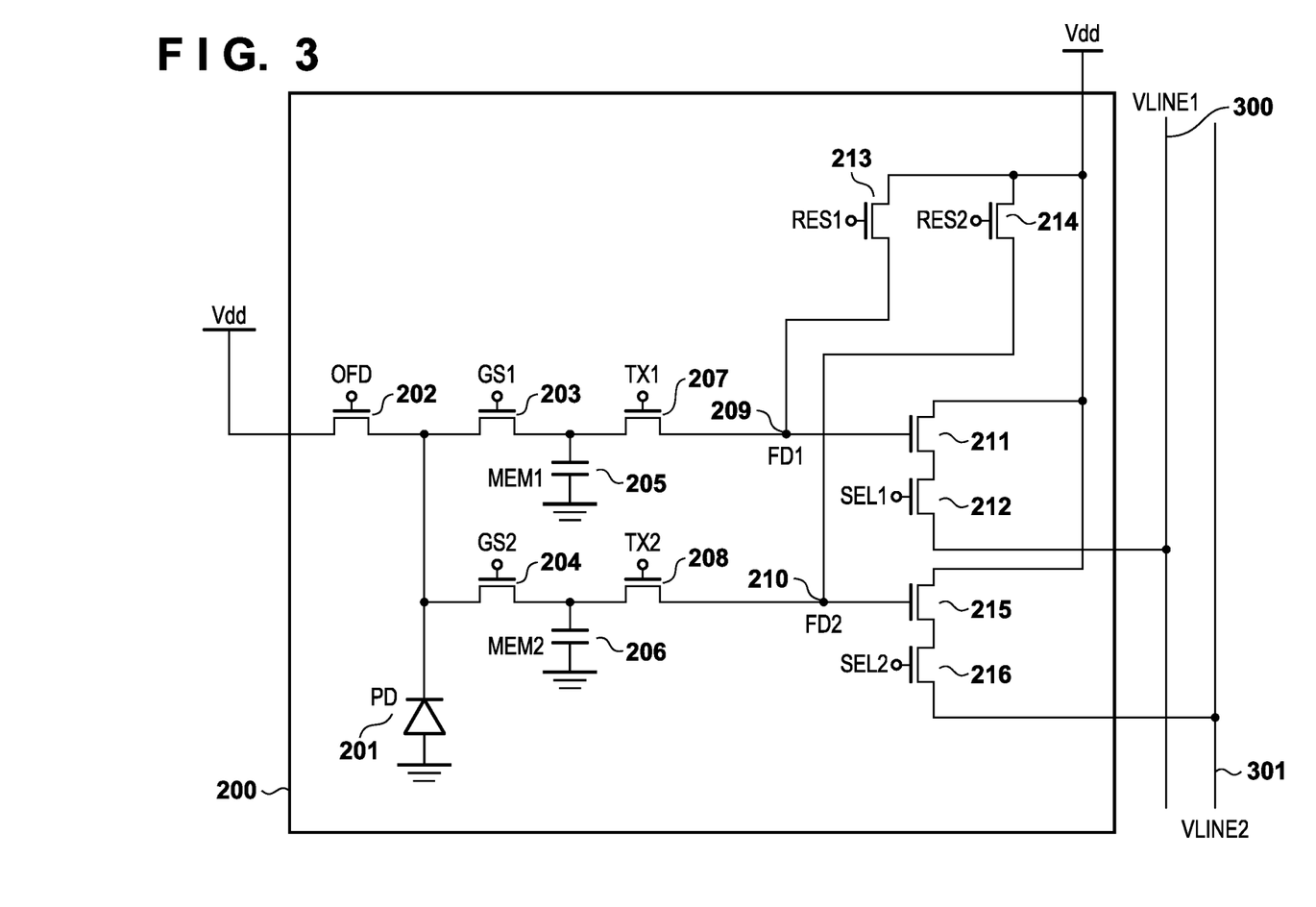
FIG. 3 is a circuit diagram that illustrates an example a configuration of a pixel that the image sensor of FIG. 2 has.

FIG. 3 is a circuit diagram illustrating an example of a configuration of the pixel 200. In the first embodiment, the pixel 200 has one photoelectric conversion device (photodiode (PD)) and two storage circuits (capacitors). The PD 201 generates an electric charge according to an amount of light that is incident on the pixel 200. The generated electric charge can be transferred to the two storage circuits MEM1_205 and MEM2_206. Each transistor (switch) is N-channel, and turns on and enters a conductive state when a high-level signal is inputted to the gate.

When the drive signal GS1 becomes the high level and a transfer gate 203 turns on, the electric charge generated in the PD 201 is transferred to MEM1_205. Then, when a drive signal TX1 becomes a high level, and a transfer gate 207 is turned on, the electric charge stored in MEM1_205 is transferred to a first floating diffusion (FD1_209).

Hereinafter, a path from the PD 201 to a column output line VLINE1_300 via MEM1_205, FD1_209, an amplification MOS transistor 211, and a pixel selection switch 212 is called a first read-out path.

FD1_209 is connected to a gate of the amplification MOS transistor 211. The amplification MOS transistor 211 outputs a voltage according to an amount of electric charge transferred from MEM1_205 to FD1_209. Accordingly, FD1_209 and the amplification MOS transistor 211 are a circuit for converting electric charge into voltage.

When a drive signal GS2 becomes a high level, and a transfer gate 204 turns on, the electric charge generated by the PD 201 is transferred to MEM2_206. Then, when a drive signal TX2 becomes the high level and a transfer gate 208 turns on, an electric charge stored in MEM2_206 is transferred to a second floating diffusion (FD2_210).

Hereinafter, the path from the PD 201 to VLINE2_301 via MEM2_206, FD2_210, and an amplification MOS transistor 215 is referred to as the second read-out path. Note that MEM2_206 need not be on the second read-out path.

FD2_210 is connected to a gate of the amplification MOS transistor 215. The amplification MOS transistor 215 outputs a voltage according to an amount of electric charge transferred from MEM2_206 to FD2_210. Accordingly, FD2_210 and the amplification MOS transistor 215 are a circuit for converting an electric charge into a voltage.

A reset switch 202 is connected to the PD 201 and Vdd (the power voltage), and turns on when the drive signal OFD that is inputted to the gate becomes a high level, and resets the PD 201 with Vdd.

The first read-out path will be described further. A reset switch 213 is connected to FD1_209 and Vdd, and turns on when the drive signal RES1 that is inputted to the gate becomes the high level, and resets FD1_209 with Vdd. Also, in addition to the drive signal RES1, when the drive signal TX1 inputted to a gate of the transfer gate 207 becomes the high level, both the reset switch 213 and the transfer gate 207 turn on, and MEM1_205 is reset by Vdd via FD1_209.

The pixel selection switch 212 turns on when the drive signal SEL1 that is inputted to the gate becomes the high level, and is connected to the amplification MOS transistor 211 and the column output line VLINE1_300. By this, the voltage of the amplification MOS transistor 211 which accords to the amount of electric charge of MEM1_205 is outputted through the column output line VLINE1_300 as a pixel signal.

The second read-out path will be described further. A reset switch 214 is connected to FD2_210 and Vdd, and turns on when a drive signal RES2 that is inputted to a gate becomes the high level, and resets FD2_210 with Vdd. Also, in addition to the drive signal RES2, when the drive signal TX2 inputted to a gate of the transfer gate 208 becomes the high level, both the reset switch 214 and the transfer gate 208 turn on, and MEM2_206 is reset by Vdd via FD2_210.

A pixel selection switch 216 turns on when the drive signal SEL2 inputted to the gate becomes the high level, and connects with the amplification MOS transistor 215 and a column output line VLTNE2_301. By this, the voltage of the amplification MOS transistor 215 according to the amount of electric charge of MEM2_206 is outputted via the column output line VLINE2_301 as a pixel signal.

Returning to FIG. 2, a vertical scanning circuit 400, based on the drive signals OFD, GS, RES, TX, and SEL outputted from the timing generator (TG) 403, generates drive signals RES, TX, SEL, OFD, GS, and the like of the pixel 200. The drive signal OFD and GS are common to all pixels, but other drive signals are generated for each pixel row. A row number is appended to a drive signal generated for each pixel row.

The plurality of pixels 200 disposed in the same pixel row is driven by a common drive signal, and the pixel signal is outputted to the column output line VLINE1_300 or VLINE2_301 for each pixel row. Note that in FIG. 2, for the sake of convenience, drive signals of the same type are described collectively as a single signal. For example, the drive signal SEL1 and the drive signal SEL2 which are supplied to the pixels of the first row are recited collectively as SEL_1.

In the present embodiment, the drive signal OFD and the drive signals GS1 and GS2 of the transfer gates 203 and 204 of the reset switch 202 are all supplied at a timing common to all of the pixels 200 of the pixel region 250. Accordingly, for all of the pixels 200, the electric charge accumulation timing is the same.

An ADC 303 is arranged for each column output line, and performs an analog-digital conversion of a difference between the pixel signal and the noise signal outputted from the pixel region 250, and outputs the pixel data. An electric current source 302 is connected to each of the column output line VLINE1_300 and VLINE2_301.

A memory 404 stores pixel data that each ADC 303 outputs in accordance with a write signal mem_write outputted from the timing generator (TG) 403. Accordingly, pixel data is stored in pixel row units in the memory 404. The pixel data stored in the memory 404 is transferred sequentially to a data output unit 402 by scanning by a horizontal scanning circuit 401. The data output unit 402 outputs pixel data to an external unit of the image sensor 106 by an LVDS (Low Voltage Differential Signaling) transmission method or the like.

Next, control for operation of the image sensor 106 at a time of continuous shooting of still images by the digital camera 1000 will be described using the timing chart illustrated in FIG. 4. Here, the still image continuous shooting is an example of capturing based on an instruction by a user.

The digital camera 1000, while a release switch included in the operation unit 111, for example, is being fully pressed, consecutively captures/records still images in a predetermined cycle (frame cycle). Note that the timing of the start of capturing changes according to the time of exposure, and the still-image capturing start timing may differ each capture.

Also, even the moving image capture performed by pressing the moving image recording switch included in the operation unit 111 is capturing that is based on an instruction by a user. By replacing the still image capturing described below with moving image frame capturing, it is possible to similarly perform flicker detection at the time of moving image capture. Capturing based on an instruction by the user can be said to be capturing of still images or a moving image whose main objective is recording.

Figure 4:
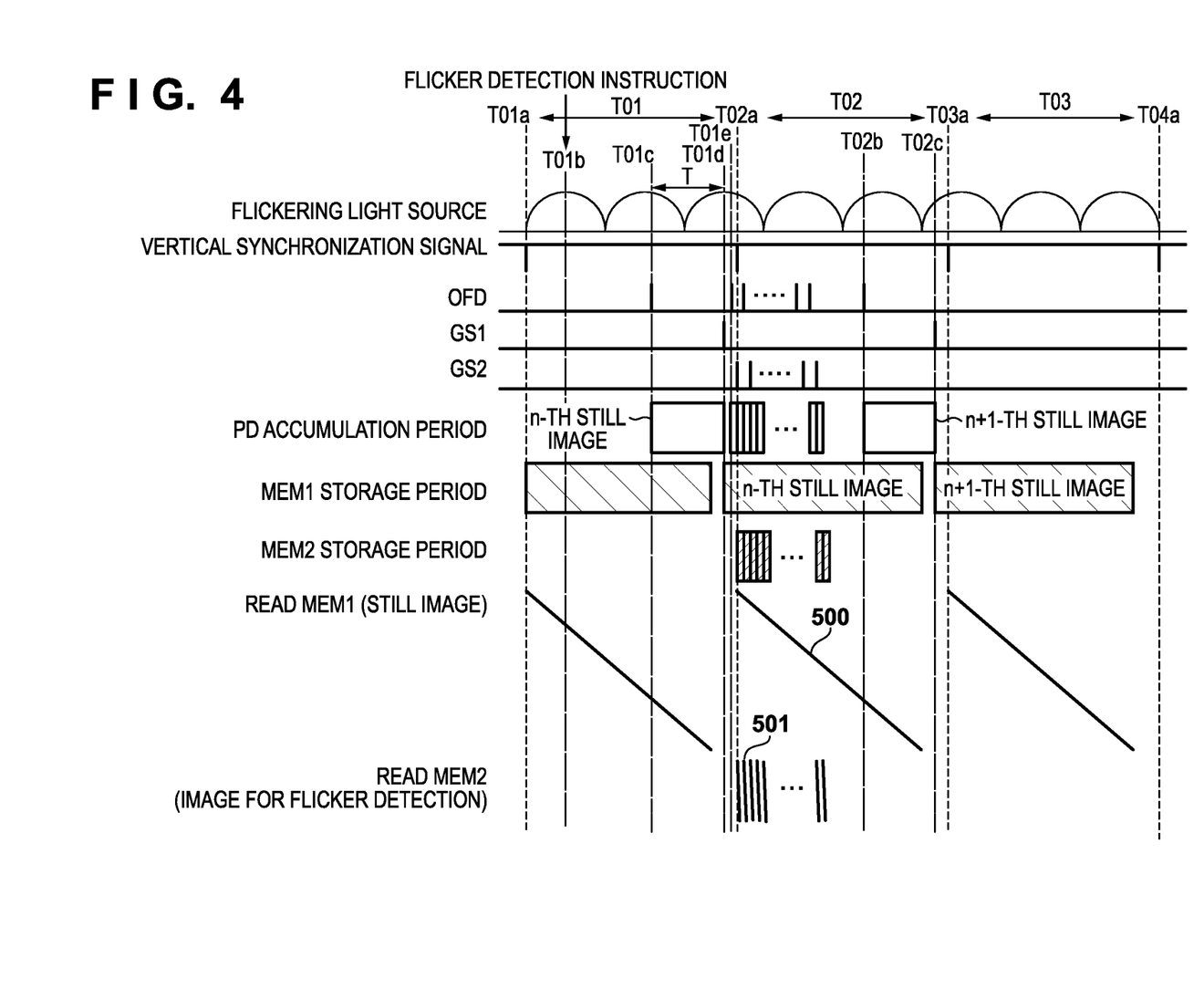
FIG. 4 is a timing chart regarding a still image continuous shooting operation in a first embodiment.

In FIG. 4, flicker detection is performed in accordance with reception of a user instruction through the operation unit 111 at a time T01b. However, flicker detection may be executed without an instruction by the user. Capturing performed for flicker detection can be said to be capturing of still images or a moving image whose main objective is detection of information.

Note that, in FIG. 4, to simplify the explanation and facilitate understanding of the operation of the image sensor 106, description regarding control of mechanical parts that is executed in conjunction with still image capturing such as driving of the focal plane shutter 104 and the aperture 101 is omitted.

Times T01a, T02a, T03a, and T04a indicate timing at which to start reading out electric charge that has accumulated in the PD 201 by still image capturing and that was transferred to MEM1_205. Also, the periods of time T01 to T03 are still image readout cycles (frame cycles).

The CPU 109 decides the time T01c which is the reset timing of the PD 201 from the relationship between the frame cycle end timing and the shutter speed. The CPU 109 sets the shutter speed (the time of exposure) and the reset timing in the timing generator (TG) 403 of the image sensor 106. Also, the CPU 109 instructs a TG 403 regarding execution of the flicker detection.

The CPU 109 can notify the TG 403 of the a flicker detection execution instruction at the point in time when an instruction is received through the operation unit 111. Alternatively, the CPU 109 may notify an instruction to execute flicker detection to the TG 403 together with the time T01c in a case where it is known that flicker detection will be performed at the point in time where the time T01c is notified. The vertical scanning circuit 400, based on a setting from the CPU 109, outputs each kind of drive signal at an appropriate timing.

The vertical scanning circuit 400 resets the PD 201 for all pixels 200 included in the pixel region 250 by setting, at the time T01c, the drive signal OFD to the high level for a predetermined amount of time. By this, the electric charge accumulation in the PD 201 is started.

The vertical scanning circuit 400 sets the drive signal GS1 to a high level for a predetermined period of time at the time T01d, and turns on the transfer gate 203. The time T01d is decided so that the period of time from the time T01c to the time T01d becomes the shutter speed (accumulation time) T. In FIG. 4, the accumulation time T is illustrated as the accumulation time of the n-th still image. By the drive signal GS1 becoming the high level, the electric charge accumulated in the PD 201 is transferred to MEM1_205 during the accumulation time T. In the first embodiment, the electric charge according to still image capturing is transferred to MEM1_205, but it may be transferred to MEM2_206.

After that, at the time T01e, the vertical scanning circuit 400 sets the drive signal OFD to the high level for a predetermined amount of time, and resets the PD 201. By this, the electric charge accumulation for the flicker detection is started in the PD 201. Details of this will be described below.

Figure 5:
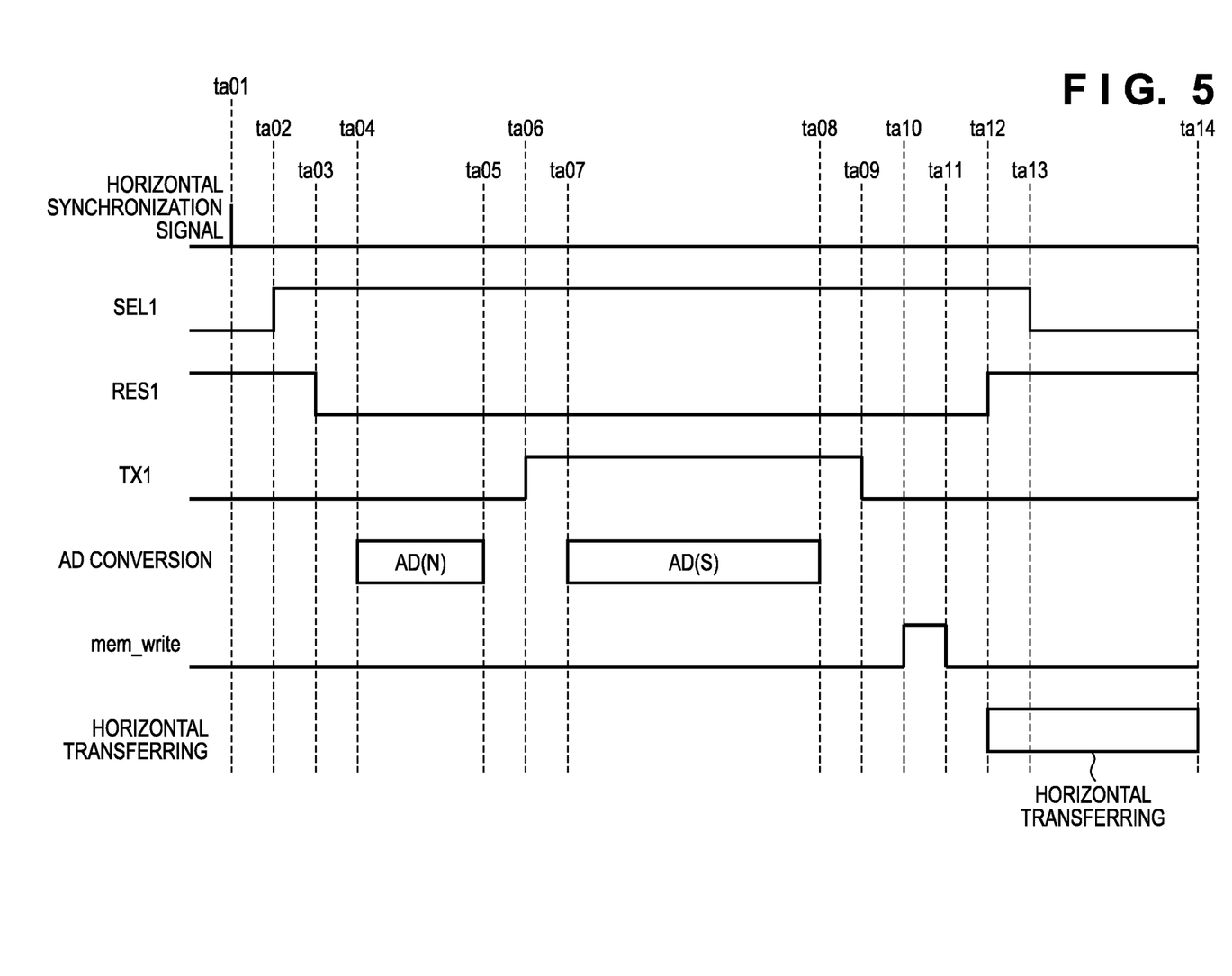
FIG. 5 is a timing chart regarding an image sensor operation in a first embodiment.

With reference to FIG. 5, a readout operation for the first line of pixel data of the pixel region 250 will be described. The horizontal synchronization signal is generated periodically during one cycle of the vertical synchronization signal illustrated of FIG. 4, and read out of pixel data is performed sequentially for each pixel row.

In the timing chart illustrated in FIG. 5, the time ta01 indicates a timing that is the same as T02a in FIG. 4. At time ta02 in FIG. 5, the vertical scanning circuit 400 turns on the pixel selection switch 212 for n pixels 200 disposed in the first line with the drive signal SEL1 as the high level for the first line of the pixel region 250. By this, a source follower circuit configured by the amplification MOS transistor 211 and the electric current source 302 enters an operational state. Since the drive signal RES1 at the time ta02 is the high level, the reset switch 213 is on, and FD1_209 is reset by Vdd.

At the time ta03, the vertical scanning circuit 400 deactivates the reset of FD1_209 by setting the drive signal RES1 to the low level. By this, the noise level for the first line of pixels 200 is outputted to the column output line VLINE1_300.

Next, at the time ta04, the TG 403 starts the AD conversion by driving the ADC 303. The ADC 303 performs an AD conversion of the noise level of each pixel.

At the time ta05, the AD conversion ends, and each ADC 303 stores the AD converted noise level.

At the time ta06, the vertical scanning circuit 400 sets the drive signal TX1 to the high level, and turns on the transfer gate 207 of the pixels 200 of the first line.

Then, the signal charge stored in MEM1_205 of each pixel 200 is transferred to the gate of the source follower configured by the amplification MOS transistor 211. The source follower outputs to the column output line VLINE1_300 electric potential (the signal level) converted from the reset level by a corresponding portion to the transferred signal charge.

Next, at the time ta07, the TG 403 drives the ADC 303 to start the AD conversion. The ADC 303 performs an AD conversion of the level of each pixel signal.

At the time ta08, the AD conversion ends, and each ADC 303 stores the AD converted pixel signal level.

In the time ta09, the vertical scanning circuit 400 sets the drive signal TX1 to the low level. Then, at the time ta10, the TG 403 sets the write signal mem_write to the high level. When the write signal mem_write becomes the high level, the ADC 303 outputs to the memory 404 the difference between the stored signal level and the noise level.

At the time ta11, the TG 403 sets the write signal mem_write to the low level. By this, the storing of pixel data to the memory 404 ends.

In the time ta12, the vertical scanning circuit 400 sets the drive signal RES1 to the high level. Also, transfer (horizontal transferring) of the pixel data from the memory 404 by the horizontal scanning circuit 401 is started.

At the time ta13, the vertical scanning circuit 400 sets the drive signal SEL1 to the low level. By this, the pixel selection switch 212 turns off, and output of the pixel signal to the column output line VLINE1_300 ends.

When at the time ta14, transfer of the pixel data obtained from one pixel row's worth of pixels 200 from the memory 404 ends, the first line readout operation ends.

By repeating a similar readout operation from the second line until the m-th line, reading of the pixel data (one frame's worth of image data) for the pixels 200 of the entire pixel region 250 completes.

Returning to FIG. 4, operation for acquiring a still image for flicker detection will be described. Capturing of an image for flicker detection is performed in between still image capturing and the PD 201 is not used for still image continuous shooting. It is possible to define in advance how many frames of images to capture for the flicker detection. Since the flicker cycle depends on the frequency of the alternating power supply that drives the light source, the imaging frame number may be defined so as to cover a predetermined amount of time that is greater than or equal to the envisioned half period of the flicker. Note that the number of imaging frames may be defined by another method.

At time T02a, reading out of the pixel signal of the n-th still image is started from MEM1_205. Also, the vertical scanning circuit 400 sets the drive signal GS2 to the high level for a predetermined amount of time, and turns on the transfer gate 204. By this, the electric charge accumulated in the PD 201 from the time T01e to time T02a is transferred to MEM2_206. Note that the timing at which to turn on the transfer gate 207 need not be aligned with the start timing for reading of the still image. Also, as described above, MEM2_206 is not required, and the electric charge may be transferred to FD2_210 (gate of the amplification MOS transistor 215) directly from the PD 201.

Accordingly, one of the first read-out path and the second read-out path is used to acquire an image for flicker detection and the other is used to acquire a still image or moving image for recording or for display. Accordingly, as with still image high-speed continuous shooting, even in a situation in which one read-out path is monopolized almost continuously, it is possible to acquire images for flicker detection.

Note that for the image for flicker detection, it is sufficient to be able to detect whether or not there is a flickering light source and the characteristics thereof (the flicker cycle and the peak timing), and being about to acquire a plurality of frames at high speed should be prioritized over exposure being optimal and high resolution. Accordingly, the image for flicker detection may be an image that is underexposed and/or low resolution.

In the example illustrated in FIG. 4, to acquire a predetermined plurality number of frames as images for flicker detection, the vertical scanning circuit 400 repeatedly generates a drive signal OFD and the drive signal GS2 in respectively fixed cycles. By this, common exposure conditions can be used for the images for flicker detection across frames.

Read out 501 of the pixel signal for the flicker detection image is performed sequentially through the column output line VLINE2_301 in parallel with the read out 500 of the pixel signal for the n-th still image using the column output line VLINE1_300. The image sensor 106 outputs pixel data of the still image from the memory 404 and pixel data of the image for the flicker detection in units of pixel rows time-divisionally, for example, in the period in which read outs 500 and 501 are performed in parallel.

The image data for flicker detection is supplied to the DSP 107. The DSP 107 determines whether or not there is a flickering light source based on the exposure period of the image for flicker detection and a change in luminance between frames. The DSP 107 can determine that there is no flickering light source in the case where luminance change between frames is less than a threshold, for example.

In the case where the DSP 107 determines that there is a flickering light source, it can detect the flicker cycle from the interval between frames in which a similar average luminance is obtained, for example, and the peak timing of the flickering light source from the capture timing of a frame whose average luminance is the maximum. Note that the method of detecting whether or not there is a flickering light source and the characteristic of the flickering light source is not limited to these and it is possible to use any publicly known methods.

The DSP 107 notifies to the CPU 109 the determination result regarding whether or not there is a flickering light source and the detection results related to the flickering light source characteristics, as flicker detection results. The CPU 109, based on the flicker detection results notified from the DSP 107, can adjust an exposure operation in the next still image capture.

Specifically, the CPU 109 does not change the next still image capturing exposure operation in the case where it is determined that there is no flickering light source by the DSP 107. In such a case, still image capturing is executed at a predetermined timing and under exposure conditions. Meanwhile, the CPU 109 can adjust the exposure period of the still image capturing and the exposure start timing in the case where it is determined that there is a flickering light source by the DSP 107 and the flicker cycle and peak timing are detected.

The CPU 109, in the case where the exposure period of still image capturing set currently, for example, is shorter than one cycle of the flicker, can adjust the start timing for the exposure so that the peak timing of the flickering light source is included in the exposure period. Note that the influence of flicker on the captured image may be reduced by adjusting the exposure operation by another method such as adjustment so that the exposure period becomes one flicker cycle or more.

Accordingly, it becomes possible to reduce the influence of the flickering light source in the still image obtained in the n+1-th still image capture started from the time T02b.

Note the image data for the flicker detection may be used, in the DSP 107, for purposes other than flicker detection such as generation of an evaluation value or the like. For example, from the image data used for the flicker detection, the DSP 107 may calculate evaluation values for AF and AE, and the CPU 109 may use the evaluation value for adjustment of exposure conditions and in-focus distance in the next still image capture. Also, the image data for display is generated by the DSP 107 from the image data for flicker detection, and may be used for a live-view display or the like in the display unit 110.

By virtue of the first embodiment, while recording from a storage circuit that the pixels have or reading out image signals for display, an image signal for information detection is acquired and flicker detection processing is executed. Thus, it is possible to perform flicker detection even in a case where an image for recording or display is continuously shot at a high speed, and it is possible to appropriately reduce the influence of the flickering light source in the image for recording or display. Also, by making the charge accumulation period according to capturing of the image for recording or display the same across the pixel row, it is possible to obtain an image for which rolling shutter distortion is reduced.

Second Embodiment

Next, a second embodiment of the present invention will be described. The second embodiment differs from the first embodiment in the pixel structure. The pixel 200 in the first embodiment has respectively independent FD1_209 and FD2_210 on the first read-out path and the second read-out path (FIG. 3).

However, the area of the FD in the pixel and the area dimension of the PD are in a trade-off relationship. Thus, when two FDs are arranged in one pixel, the area of the PD is reduced more than when one FD is arranged in one pixel. When the area of the PD is reduced, the maximum received light amount per unit time is reduced, and the dynamic range of a pixel is narrowed.

In the second embodiment, as one FD arranged in a pixel, by configuring to share the same FD in the first read-out path and the second read-out path, a similar effect to the first embodiment is achieved without reducing the dynamic range of the pixels.

Other than the configuration of the pixel, the second embodiment can be implemented with the digital camera 1000 having a configuration similar to the first embodiment. Thus, in the description of the configuration of the pixel in the second embodiment below, operation control by the image sensor 106 will be described.

Figure 6:
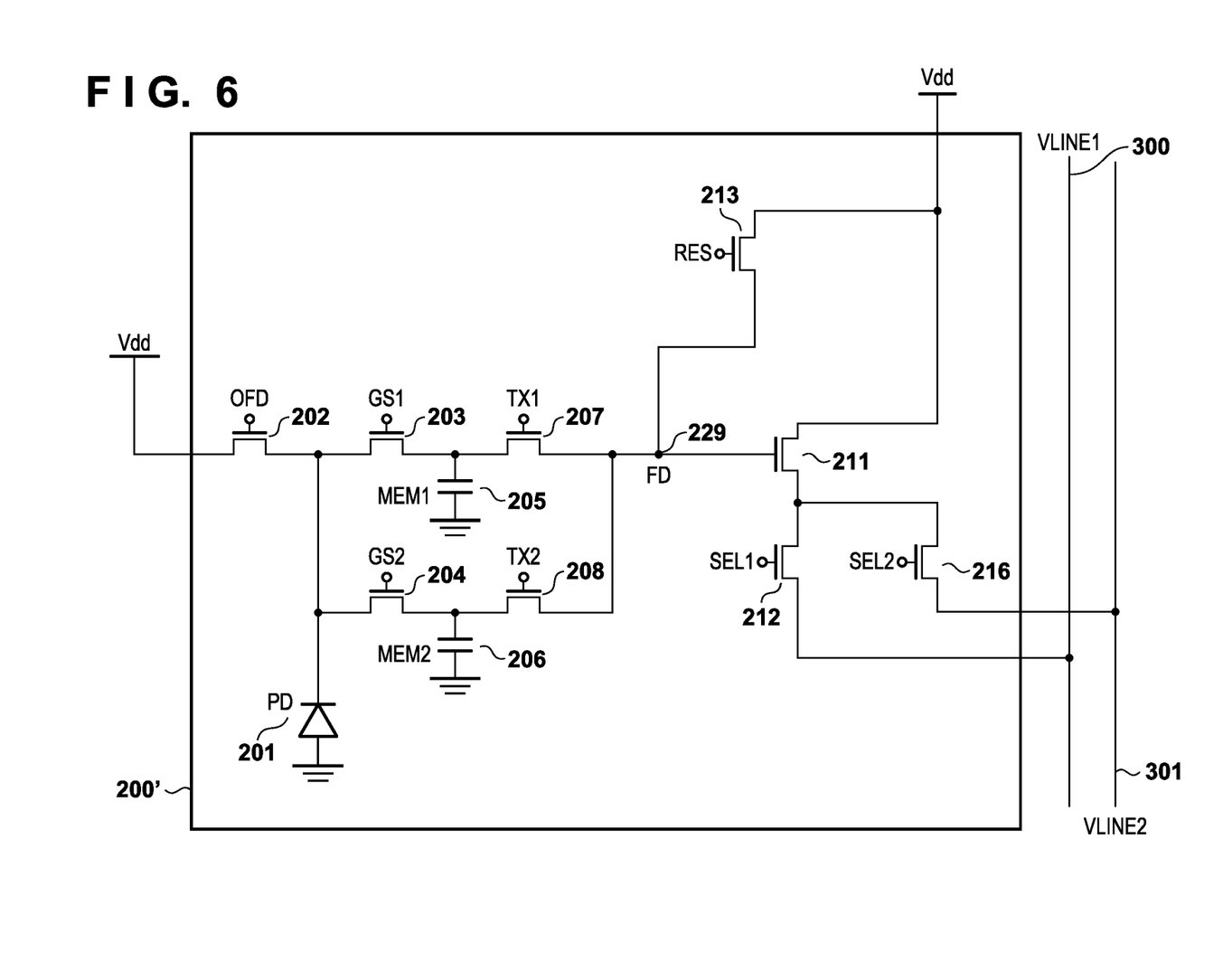
FIG. 6 is a circuit diagram that illustrates an example of a configuration of a pixel in a second embodiment.

FIG. 6 is a circuit diagram illustrating an example of a configuration of a pixel 200' that is disposed in the pixel region 250 of the image sensor 106 in the second embodiment. In FIG. 6, the same reference numerals are given as in FIG. 3 for configurations similar to the first embodiment, and description thereof is omitted. The pixel 200' does not have FD2_210, the reset switch 214, and the amplification MOS transistor 215 that the pixel 200 of the first embodiment has. Also, the pixel selection switch 216 selectively connects the amplification MOS transistor 211 to the column signal line VLINE2_301. Note that even in the second embodiment, the storage circuit MEM2_206 in the second read-out path is not essential.

In the second embodiment, when the drive signal TX1 becomes the high level and the transfer gate 207 turns on, the electric charge stored in MEM1_205 is transferred to the FD_229. In the second embodiment, a path from the PD 201, via MEM1_205, FD_229, the amplification MOS transistor 211, and the pixel selection switch 212, to the column signal line VLINE1_300 is referred to as the first read-out path.

Also, when the drive signal TX2 becomes the high level and the transfer gate 208 turns on, the electric charge stored in MEM2_206 is transferred to FD_229. In the second embodiment, a path from the PD 201, via FD_229, the amplification MOS transistor 211, and the pixel selection switch 216, to the column signal line VLINE2_301 is referred to as a second read-out path.

In the second embodiment, since one FD is shared between two read-out paths, it is not possible to execute the MEM1_205 read out and MEM2_206 read out in parallel (when read out is executed in parallel, an electric charge ends up being added by the FD 209). Accordingly, read out of MEM1_205 and read out of MEM2_206 are basically executed mutually exclusively.

Figure 7:
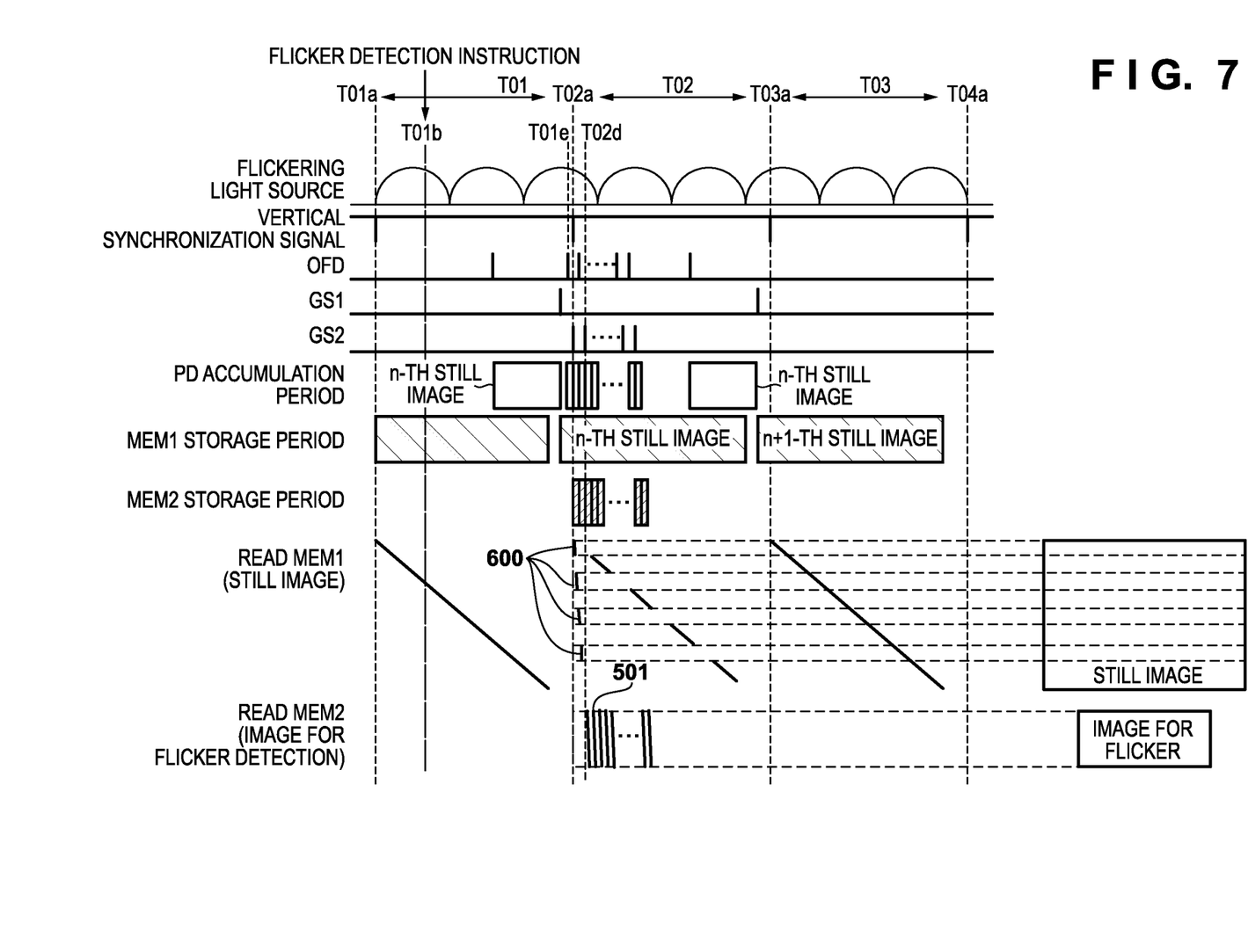
FIG. 7 is a timing chart regarding a still image continuous shooting operation in the second embodiment.

Operation control of the image sensor 106 during still image continuous shooting in the second embodiment will be described using the timing chart illustrated in FIG. 7. In FIG. 7, the same reference numerals as in FIG. 4 are added for elements that are the same as in the first embodiment.

Reading out of the still image from MEM1_205 is started at the times T01a, T02a, T03a, and T04a, similarly to the first embodiment. Also, T01 to T03 are a still image read out start cycle (frame cycle).

In the second embodiment, in a frame for which flicker detection is executed, when a still image is read out from MEM1_205, a readout is performed first for a pixel row used to acquire the image data for flicker detection. In the example illustrated in FIG. 7, the resolution in the vertical direction of the image for flicker detection is lower than the resolution in the vertical direction of the still image. Accordingly, as illustrated in 600 of FIG. 7, a still image read out is executed first for the pixel row used to acquire the image for the flicker detection. Such a read out can be realized by the TG 403 and the vertical scanning circuit 400 supplying a drive signal to the pixel 200' in accordance with control by the CPU 109.

Meanwhile, after the end of the exposure duration of the n-th still image capture, the vertical scanning circuit 400 sets the drive signal OFD to the high level for a predetermined amount of time in the time T01e, to thereby reset the PD 201 for all pixels 200 included in the pixel region 250. By this, the electric charge accumulation (capturing) of the image for flicker detection is started in the PD 201.

The vertical scanning circuit 400 sets the drive signal GS2 to the high level for a predetermined period of time at the time T02a, and turns on the transfer gate 204. By this, the electric charge accumulated in the PD 201 from the time T01e to time T02a is transferred to MEM2_206.

At the time T02d, still image reading for the pixel row to be used for images for flicker detection from MEM1_205 completes. Thus, the vertical scanning circuit 400 executes a read out of the images for flicker detection from MEM2_206 and reads out the still image from MEM1_205 time-divisionally.

For the image row to be used for acquiring the image for flicker detection, the signals read out from MEM2_206 are outputted to the column output line VLINE2_301 and for other pixel rows, the signals read out from MEM1_205 are outputted to the column output line VLINE1_300. In the case where there is no MEM2_206, for the image row to be used for acquiring the images for flicker detection, an electric charge transferred from the PD 201 is outputted to the column output line VLINE2_301 without accumulation.

The vertical scanning circuit 400, from the time T02d, supplies a drive signal for performing such read control for each pixel row. To prioritize obtaining a plurality of frames of images for flicker detection, as illustrated in FIG. 7, it is possible to only read out 501 (read out from MEM2_206) of the pixel row to be used to acquire images for the flicker detection may be executed repeatedly. In such a case, until the acquisition of a predetermined number of frames of image data for flicker detection completes, read out of still images from MEM1_205 is interrupted.

In FIG. 7, for the sake of convenience, read out 501 of images for the flicker detection appears to temporally overlap the read out of the still image, but actually the readout of still images from the time T02d and the read out of images for flicker detection are executed substantially mutually exclusively. Here, substantially means that the read out of MEM1_205 related to the pixel row read out alreay by the read out illustrated in 600 may be executed in parallel with the read out of images for flicker detecting from MEM2_206. In such a case, the signal read out from MEM1_205 does not influence the signal read out from MEM2_206 even if it is added by the FD 209.

By virtue of the second embodiment, by configuring to share one FD between two read-out paths, it is possible to make the area that the PD covers in the pixel larger than in the first embodiment. Thus, in addition to it being possible to perform the flicker detection being in parallel to the read out of the still image, the widening of the dynamic range of the pixel is enabled.

Third Embodiment

Next, a third embodiment of the present invention will be described. The third embodiment is related to a flicker detection operation in the case where still image capturing exposure period is long. In the third embodiment, a similar digital camera 1000 to in the first embodiment is targeted.

Figure 8:
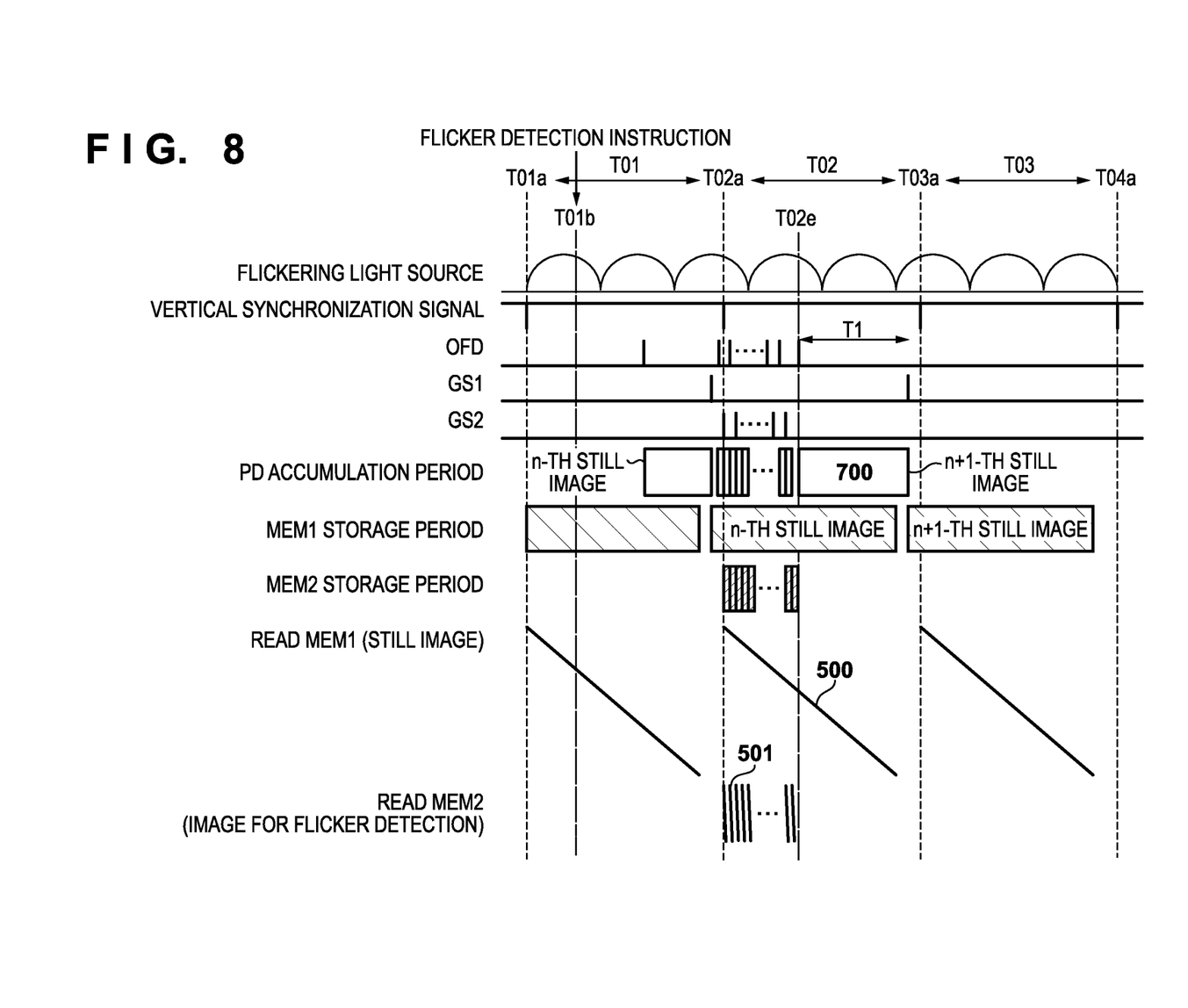
FIG. 8 is a timing chart regarding a still image continuous shooting operation in a third embodiment.
Figure 9:
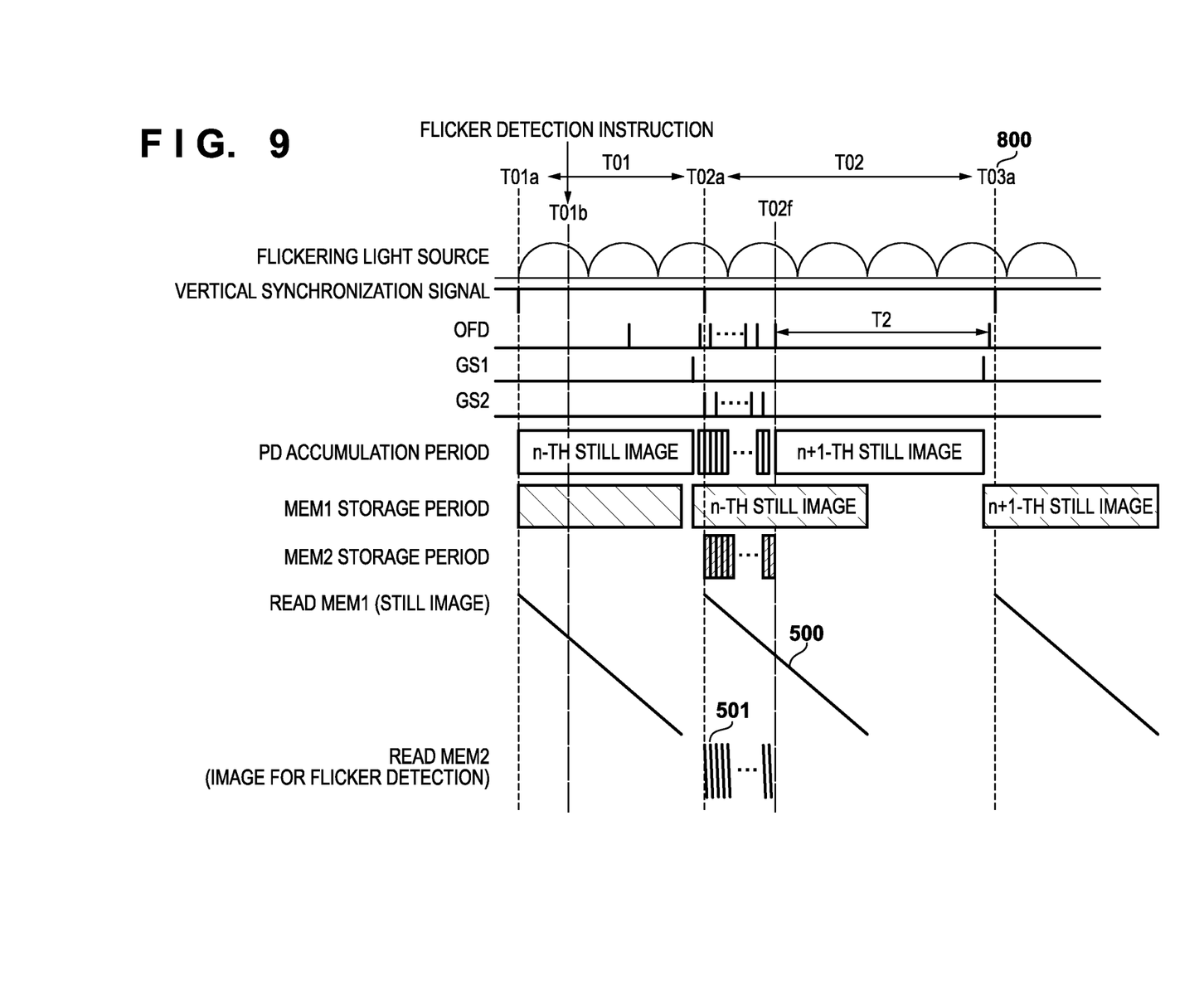
FIG. 9 is a timing chart regarding a still image continuous shooting operation in the third embodiment.

Control for operation of the image sensor 106 at a time of continuous shooting of still images in the third embodiment will be described using the timing chart illustrated in FIG. 8 and FIG. 9. In FIG. 8 and FIG. 9, the same reference numerals as in FIG. 4 will be given for elements that are the same as in the first embodiment.

Reading out of the still image from MEM1_205 is started at the times T01a, T02a, T03a, T04a, similarly to the first embodiment. Also, T01 to T03 are a still image read out start cycle (frame cycle).

In FIG. 4, the period of time from the time T02b to the time T02c is set to be the still image accumulation time T, but if after completion of the read out 501 of the images for the flicker detection from MEM2_206, it is possible to start still image capture accumulation period (start capturing). FIG. 8 is a timing chart for performing still image capturing in the maximum accumulation period T1, in the same frame cycle as the first embodiment. Also, FIG. 9 is a timing chart for the case of performing still image capturing at the accumulation time T2, which is longer than T1, by extending the frame period.

In the third embodiment, a case where the frame cycle □ (the time it takes to read the images for flicker detection+the accumulation time for the next still image) will be described using FIG. 8, and a case where the frame cycle<(the time it takes to read the images for flicker detection+the accumulation time for the next still image) will be described using FIG. 9.

FIG. 8 and FIG. 9 are both for the performance of flicker detection in accordance with a user instruction through the operation unit 111 at the time T01b being received to clarify the difference from the first embodiment (FIG. 4). However, flicker detection may be executed without an instruction by the user. Also, moving image capture is similar to still image continuous shooting in that consecutive capturing is being performed.

Operation up to the completion of capturing of the n-th still image is the same as in the first embodiment and so description thereof will be abbreviated. At the time T02a, read out of an electric charge which is obtained by still image capturing and which is stored in MEM1_205 is started. As described using FIG. 4 and FIG. 5, in parallel to the read out of the electric charge from MEM1_205, capturing of an image for flicker detection and read out 501 are executed repeatedly for a plurality of frames.

In FIG. 8, read out of an image for flicker detection is assumed to be completed at the time T02e. The CPU 109 starts capturing 700 of the (n+1)-th still image when the read out of the images for the flicker detection completes. By this, it is possible to make the accumulation time (the shutter speed) according to still image capturing be the accumulation time T1 which is longer (slower) than the accumulation time T according to the n-th still image capture. Note, the accumulation time T1 is a maximum accumulation period that can be implemented without changing the frame cycle. The accumulation time T1 is defined in accordance with the frame cycle, the acquisition time for one frame of an image for flicker detection (the time required for an electric charge accumulation, a charge transfer, and read out), and the number of frames of the image for flicker detection.

In the case where it is necessary to capture a still image with the accumulation time T2 which is longer than T1, as indicated by 800 in FIG. 9, the time T03a, which is the still image read start timing is delayed (the image capturing period is extended). In such a case, so as to reduce the delay time of the time T03a as much as possible, the start timing of the still image capturing is made to be the time T02f immediately after completion of read out of an image for flicker detection.

The CPU 109, in the case where the shutter speed decided in AE, for example, or a shutter speed that the user set is longer than T1, controls operation of the TG 403 so as to delay the read start timing of a captured still image. In such a case, since the frame cycle is extended, as a result, the continuous shooting speed is lowered.

By virtue of the third embodiment, in addition to the effect of the first embodiment, by permitting a longer shutter speed, it becomes possible to handle more flexible still image capturing. Note that the third embodiment can be implemented based on the second embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-122346, filed on Jul. 16, 2020, which is hereby incorporated by reference herein in its entirety.

What is claimed is:

1. An image capture apparatus, comprises:
an image sensor; and
a controller that controls operation of the image sensor, wherein
the image sensor has a plurality of pixels,
each of the plurality of pixels comprises
a photoelectric conversion device; and
a first storage circuit that stores an electric charge obtained by the photoelectric conversion device, and
has a first read-out path for reading an electric charge stored in the first storage circuit, and a second read-out path for reading an electric charge obtained by the photoelectric conversion device without going through the first storage circuit, and wherein
the controller controls operation of the image sensor so that:
an electric charge obtained by the photoelectric conversion device related to capturing based on an instruction by a user is read via the first read-out path;
an electric charge obtained by the photoelectric conversion device related to capturing for information detection is read via the second read-out path; and
reading via the second read-out path of the electric charge obtained by the photoelectric conversion device related to capturing for information detection is executed in a period overlapping a period for reading an electric charge via the first read-out path.

2. The image capture apparatus according to claim 1, wherein the capturing based on the instruction by the user is performed consecutively, and the capturing for the information detection is performed in between capturing based on the instruction of the user.

3. The image capture apparatus according to claim 1, wherein the reading via the first read-out path is performed in a predetermined cycle, and the controller, in a case where an accumulation period for the capturing based on the instruction of the user is longer than a predetermined threshold, controls operation of the image sensor to extend the predetermined cycle.

4. The image capture apparatus according to claim 1, wherein the controller controls operation of the image sensor such that the reading via the first read-out path and the reading via the second read-out path are executed in parallel.

5. The image capture apparatus according to claim 1, wherein the controller controls operation of the image sensor such that the reading via the first read-out path and the reading via the second read-out path are executed mutually exclusively.

6. The image capture apparatus according to claim 5, wherein the controller controls operation of the image sensor such that, in the reading via the first read-out path, the reading an electric charge of a pixel corresponding to a pixel to be used for capturing for the information detection is executed, and then the reading via the second read-out path is executed.

7. The image capture apparatus according to claim 1,
each of the plurality of pixels further comprises a second storage circuit that stores an electric charge obtained by the photoelectric conversion device, and
the reading via the second read-out path is reading of an electric charge stored in the second storage circuit.

8. The image capture apparatus according to claim 1, wherein an image for the information detection is an image for detecting information related to a flickering light source.

9. The image capture apparatus according to claim 8, wherein the information regarding the flickering light source includes whether or not there is a flickering light source and a flickering light source characteristic.

10. The image capture apparatus according to claim 9, wherein the flickering light source characteristic includes a flicker cycle, a peak timing, or both.

11. The image capture apparatus according to claim 8, wherein the controller, based on the information related the flickering light source, sets a condition of capturing based on the instruction by the user so as to reduce an influence of the flickering light source.

12. The image capture apparatus according to claim 1, wherein in the capturing based on the instruction by the user, a charge accumulation period is common to the plurality of pixels.

13. A control method of an image capture apparatus that comprises
an image sensor; and
a controller that controls operation of the image sensor, the image sensor having a plurality of pixels,
each of the plurality of pixels comprising
a photoelectric conversion device and
a first storage circuit that stores an electric charge obtained by the photoelectric conversion device, and
having a first read-out path for reading an electric charge stored in the first storage circuit and a second read-out path for reading an electric charge obtained by the photoelectric conversion device without going through the first storage circuit, wherein
the method comprises:
reading, via the first read-out path, an electric charge obtained by the photoelectric conversion device related to capturing based on an instruction by a user; and
reading, via the second read-out path, an electric charge obtained by the photoelectric conversion device related to capturing for information detection, and
wherein the reading via the second read-out path is executed in a period overlapping a period for reading an electric charge via the first read-out path.

* * * * *